(12) United States Patent
Prainsack et al.

(10) Patent No.: US 8,040,979 B2
(45) Date of Patent: Oct. 18, 2011

(54) GENERATING A PHASE VALUE FOR A COMPLEX SIGNAL

(75) Inventors: Josef Prainsack, Graz (AT); Markus Dielacher, Graz (AT); Martin Flatscher, Graz (AT); Rainer Matischek, Graz (AT)

(73) Assignee: Infineon Technologies AG, Neubiberg (DE)

( * ) Notice: Subject to any disclaimer, the term of this patent is extended or adjusted under 35 U.S.C. 154(b) by 706 days.

(21) Appl. No.: 12/050,433

(22) Filed: Mar. 18, 2008

(65) Prior Publication Data

US 2009/0237155 A1 Sep. 24, 2009

(51) Int. Cl.
*H03K 9/00* (2006.01)
*H03D 3/22* (2006.01)

(52) U.S. Cl. ......... 375/329; 375/331; 375/332; 329/302

(58) Field of Classification Search .......... 329/300, 329/302, 303, 304, 306, 310, 345; 375/322, 375/323, 324, 328, 329, 334, 340, 346, 326, 375/331, 332
See application file for complete search history.

(56) References Cited

U.S. PATENT DOCUMENTS

| | | | |
|---|---|---|---|
| 3,825,737 A | | 7/1974 | Croisier |
| 4,933,916 A | | 6/1990 | May et al. |
| 5,524,026 A | * | 6/1996 | Murata ............ 375/329 |
| 5,610,949 A | | 3/1997 | Petranovich |
| 6,310,925 B1 | | 10/2001 | Kitta |
| 6,556,509 B1 | | 4/2003 | Cekorich et al. |
| 6,566,941 B2 | | 5/2003 | Guo |
| 6,567,777 B1 | | 5/2003 | Chatterjee |
| 7,039,130 B2 | | 5/2006 | Hurley |

OTHER PUBLICATIONS

J.T. Kristensen webpage entitled "Demodulation" available at http://kom.aau.dk/group/05gr506/report/node10.html; dated Dec. 13, 2005; 9 pgs.
J.T. Kristensen webpage entitled "Quadrature Detection" available at http://kom.aau.dk/group/05gr506/report/node29.html; dated Dec. 13, 2005; 19 pgs.
Planetmath Encyclopedia webpage entitled "Cyclometric Functions" available at http://planetmath.org/encyclopedia/CyclometricFunctions.html; modified Jul. 24, 2006; 3 pgs.
Planetmath Encyclopedia webpage entitled "Taylor Series of Arcus Tangent" available at http://planetmath.org/encyclopedia/TaylorSeriesOfArcusTangent.html; modified Oct. 20, 2007; 2 pgs.

* cited by examiner

*Primary Examiner* — Ryan Johnson
(74) *Attorney, Agent, or Firm* — Dicke, Billig & Czaja, PLLC

(57) ABSTRACT

A method of generating a phase value representative of a phase of a complex signal that includes an in-phase component and a quadrature-phase component includes determining a first sign for a first value and a second sign for a second value based on a quadrant occupied by the complex signal. The in-phase component is multiplied by the first value with the first sign, thereby generating a first multiplication result. The quadrature-phase component is multiplied by the second value with the second sign, thereby generating a second multiplication result. The first multiplication result, the second multiplication result, and a bias value are added, thereby generating the phase value for the complex signal.

21 Claims, 4 Drawing Sheets

GENERATING A PHASE VALUE FOR A COMPLEX SIGNAL

BACKGROUND

Frequency shift key (FSK) and phase shift key (PSK) demodulators typically make use of some technique for determining a phase of a complex signal. The hardware for implementing some phase determination techniques can be relatively complex, with a relatively large bit-width. Some of the techniques are vulnerable to frequency offsets due to the frequency drift between the transmitter's and the receiver's local oscillator and some have a quadratic dependency on amplitude variation. Some of the approaches for determining the phase of a complex signal use lookup tables, which need a relatively large amount of memory space.

SUMMARY

One embodiment provides a method of generating a phase value representative of a phase of a complex signal that includes an in-phase component and a quadrature-phase component. The method includes determining a first sign for a first value and a second sign for a second value based on a quadrant occupied by the complex signal. The in-phase component is multiplied by the first value with the first sign, thereby generating a first multiplication result. The quadrature-phase component is multiplied by the second value with the second sign, thereby generating a second multiplication result. The first multiplication result, the second multiplication result, and a bias value are added, thereby generating the phase value for the complex signal.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

Figure 1:
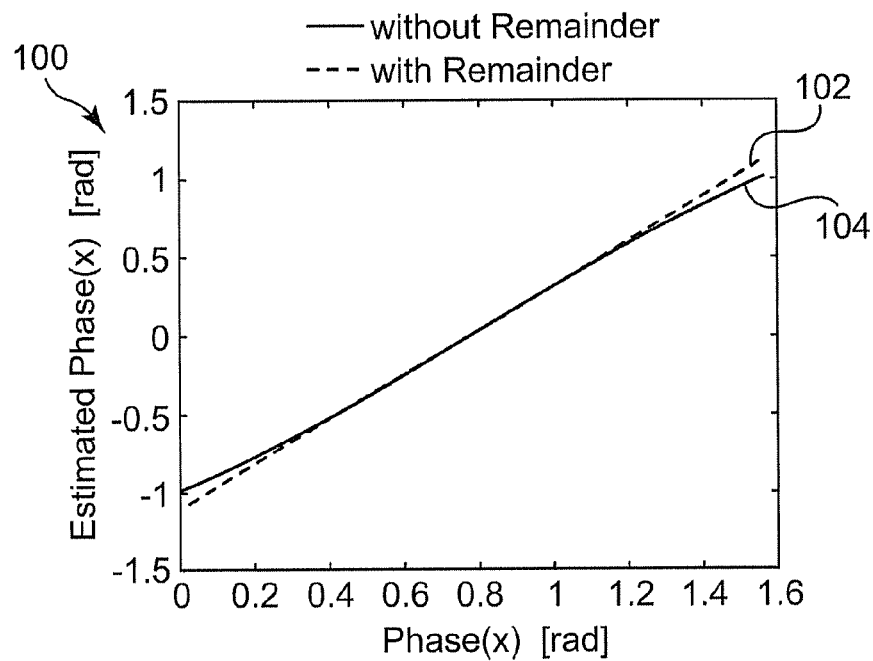
FIG. 1 is a diagram illustrating a graph of estimated phase versus actual phase for the first quadrant using a first order Taylor polynomial for the estimation according to one embodiment.

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

One embodiment provides a low-complexity phase approximation system and method for complex signals, which can be applied in low power phase demodulators (e.g., phase shift key or PSK demodulators) and frequency demodulators (e.g., frequency shift key or FSK demodulators). The system and method according to one embodiment make use of Taylor polynomials, and provide phase estimates for all four quadrants without any discontinuities. Conventional phase approximation techniques are outperformed in one embodiment with respect to timing behavior, power consumption, and area requirements.

The arcus tangent (arctan) function is commonly used in communication systems to calculate the phase of a complex signal. The arcus tangent function can be represented by a Taylor series as shown in the following Equation I:

$$\arctan(x) = \sum_{n=0}^{\infty} \frac{(-1)^n x^{2n+1}}{2n+1} = x - \frac{x^3}{3} + \frac{x^5}{5} - \frac{x^7}{7} \qquad \text{Equation I}$$

The derivative of the arcus tangent function can be written as shown in the following Equation II:

$$\frac{d}{dx}\arctan(x) = \frac{1}{1+x^2} \qquad \text{Equation II}$$

For a two-dimensional function, $f(x,y)=\arctan(y/x)$, the partial derivative of this function with respect to x can be written as shown in the following Equation III:

$$f_x(x, y) = \frac{d}{dx}\arctan\left(\frac{y}{x}\right) = \frac{-y}{x^2 + y^2} \qquad \text{Equation III}$$

The partial derivative of the two-dimensional function, f(x,y)=arctan(y/x), with respect to y can be written as shown in the following Equation IV:

$$f_y(x, y) = \frac{d}{dy}\arctan\left(\frac{y}{x}\right) = \frac{x}{x^2 + y^2} \quad \text{Equation IV}$$

Taylor series can be used to approximate the function, f(x,y)=arctan(y/x), around an initial point $(x_0, y_0)$. By summing up all terms of higher order than the first term into a remainder, $R_2(x, y)$, the Taylor series for the function, f(x,y)=arctan(y/x), can be written as shown in the following Equation V:

$$\begin{aligned}\arctan(y/x) &= f(x_0, y_0) + (1/1!)[(x - x_0) \cdot f_x(x_0, y_0) + \\ &\quad (y - y_0) \cdot f_y(x_0, y_0)] + R_2(x, y) \\ &= \arctan(y_0/x_0) + [(x - x_0) \cdot (-y/(x_0^2 + y_0)) + \\ &\quad (y - y_0) \cdot (x_0/(x_0^2 = y_0^2))] + R_2(x, y)\end{aligned} \quad \text{Equation V}$$

An initial point, $(x_0, y_0)$, may be chosen as shown in the following Equation VI:

$$x_0 = y_0 = \frac{A}{\sqrt{2}} \quad \text{Equation VI}$$

Substituting Equation VI into Equation V results in the following Equation VII:

$$\begin{aligned}\arctan\left(\frac{y}{x}\right) &= \frac{\pi}{4} + \frac{1}{A^2} \cdot \frac{A}{\sqrt{2}}[y - x] + R_2(x, y) \\ &= \frac{\pi}{4} + \frac{1}{A \cdot \sqrt{2}}[y - x] + R_2(x, y)\end{aligned} \quad \text{Equation VII}$$

The above equations can be applied to communication systems. Some communication systems use complex signals that include a real component or in-phase component ($x_I$) and an imaginary component or quadrature-phase component ($x_Q$). For the phase, $\phi[n]$ (where n is a sample index), of a complex signal, $x[n]=x_I[n]+j \cdot x_Q[n]$ (with an amplitude, A) on the interval, $$\phi[n] \in \left[0, \frac{\pi}{2}\right],$$

Equation VII can be rewritten as shown in the following Equation VIII:

$$\phi[n] = \frac{\pi}{4} + \frac{1}{A \cdot \sqrt{2}}[x_Q[n] - x_I[n]] + R_2(x_Q[n], x_I[n]) \quad \text{Equation VIII}$$

The phase of the complex signal, x[n], can be estimated or approximated as shown in the following Equation IX:

$$\begin{aligned}\hat{\phi}[n] &= \phi[n] - R_2(x_Q[n], x_I[n]) \\ &= [x_Q[n] - x_I[n]] \cdot \frac{1}{A[n] \cdot \sqrt{2}} + \frac{\pi}{4}\end{aligned} \quad \text{Equation IX}$$

In Equation IX, $\hat{\phi}[n]$ represents a phase estimation, and $R_2$ represents the remainder of the higher order terms of the Taylor series. Since in most communication system applications, it is not necessary to know the absolute value of the phase of the complex signal, x[n], but rather the changes in the phase, a constant gain and/or constant offset will not disturb the application. The hardware effort can be reduced by calculating the proportional value to the phase, as shown in the following Equation X:

$$[x_Q[n] - x_I[n]] = \left(\hat{\phi}[n] - \frac{\pi}{4}\right) \cdot A[n] \cdot \sqrt{2} \quad \text{Equation X}$$

FIG. 1 is a diagram illustrating a graph 100 of estimated phase versus actual phase for the first quadrant using a first order Taylor polynomial for the estimation according to one embodiment. The vertical axis represents the estimated phase in radians, and the horizontal axis represents the actual phase in radians. Curve 102 represents the phase ($\phi[n]$) when the remainder (e.g., $R_2$ in Equation IX) is included in the estimation, and curve 104 represents the estimated phase ($\hat{\phi}[n]$) when the remainder is not included in the estimation. The phase is approximated by a first order Taylor polynomial around the initial point, $$x_0 = \frac{A}{\sqrt{2}} + j \cdot \frac{A}{\sqrt{2}},$$

which corresponds to an initial phase of $$\phi_0 = \frac{\pi}{4}$$

radians, or about 0.79 radians. Around this initial point, curves 102 and 104 are basically the same, indicating that the phase estimation without the remainder (i.e., curve 104) is accurate at these locations. However, as the distance from the initial point increases in either direction (and approaches zero radians to the left, or $$\frac{\pi}{2}$$

radians to the right), the curves 102 and 104 begin to deviate, indicating that there is an error in the phase estimation without the remainder (i.e., curve 104).

In order to extend the phase approximation to the second quadrant, the initial point is switched to $$x_0 = -\frac{A}{\sqrt{2}} + j \cdot \frac{A}{\sqrt{2}},$$

which corresponds to an initial phase of $$\phi_0 = \frac{3\pi}{4}, \text{ for } \phi[n] \in \left[\frac{\pi}{2}, \pi\right].$$

Figure 2:
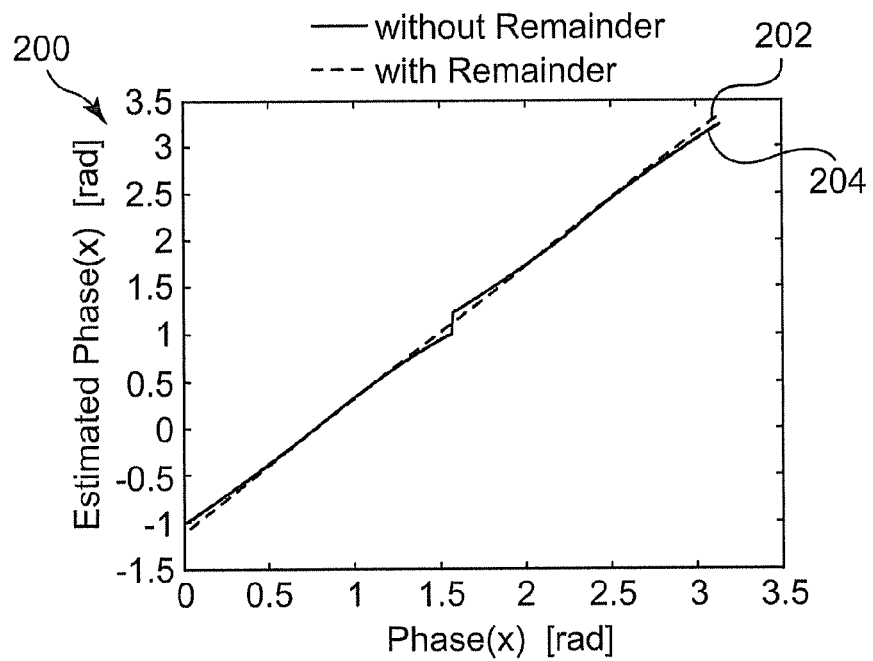
FIG. 2 is a diagram illustrating a graph of estimated phase versus actual phase for the first and second quadrants using a first order Taylor polynomial for the estimation according to one embodiment.

A bias value of $$\frac{\pi}{2} \cdot A[n] \cdot \sqrt{2}$$

is also added. FIG. 2 is a diagram illustrating a graph 200 of estimated phase versus actual phase for the first and second quadrants using a first order Taylor polynomial for the estimation according to one embodiment. The vertical axis represents the estimated phase in radians, and the horizontal axis represents the actual phase in radians. Curve 202 represents the phase ($\phi[n]$) when the remainder (e.g., $R_2$ in Equation IX) is included in the estimation, and curve 204 represents the estimated phase ($\hat{\phi}[n]$) when the remainder is not included in the estimation. The phase is approximated by a first order Taylor polynomial around the initial point mentioned above, which corresponds to an initial phase of $$\phi_0 = \frac{3\pi}{4}$$

radians, or about 2.36 radians. Due to the rejection of the remainder, $R_2$, there is a discontinuity in the estimate phase (curve 204) at the $$\frac{\pi}{2}$$

border.

Figure 3:
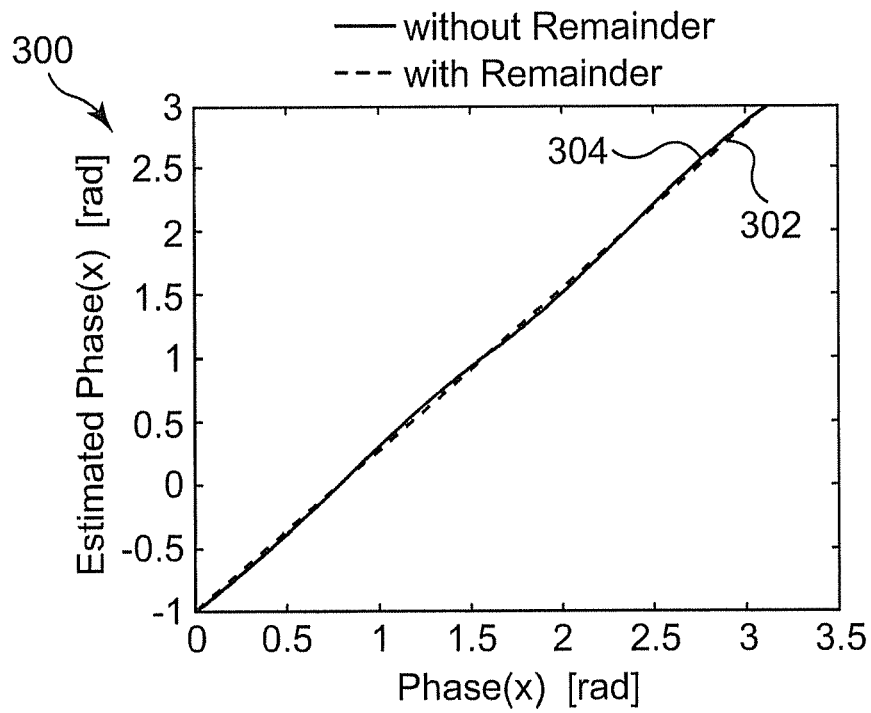
FIG. 3 is a diagram illustrating a graph of estimated phase versus actual phase for the first and second quadrants using a first order Taylor polynomial for the estimation according to another embodiment.

By changing the bias value, the discontinuity shown in FIG. 2 can be prevented as shown in FIG. 3. FIG. 3 is a diagram illustrating a graph 300 of estimated phase versus actual phase for the first and second quadrants using a first order Taylor polynomial for the estimation according to another embodiment. The vertical axis represents the estimated phase in radians, and the horizontal axis represents the actual phase in radians. Curve 302 represents the phase ($\phi[n]$) when the remainder (e.g., $R_2$ in Equation IX) is included in the estimation, and curve 304 represents the estimated phase ($\hat{\phi}[n]$) when the remainder is not included in the estimation. The phase is approximated as described above with respect to FIG. 2, but the bias value is changed to $2 \cdot A = 2 \cdot x_I[n]$, which eliminates the discontinuity shown in FIG. 2.

Since $[x_Q[n] - x_I[n]] \in (-A, A)$ moves $2 \cdot A$ instead of $$\frac{\pi}{2} \cdot A[n] \cdot \sqrt{2}$$

within one quadrant, and therefore the gain is reduced, the resulting phase approximation for the first quadrant, $\hat{\psi}_1[n]$, may be written as shown in the following Equation XI:

$$[x_Q[n] - x_I[n]] = \left(\hat{\phi}[n] - \frac{\pi}{4}\right) \cdot A[n] \cdot \frac{4}{\pi} = \hat{\psi}_1[n] \quad \text{Equation XI}$$

Using a 2-bit finite state machine (FSM) with four states to manage quadrant changes, this phase estimation can be extended to all four quadrants (i.e., using $\hat{\psi}_1[n]$ for the first quadrant, $\hat{\psi}_2[n]$ for the second quadrant, $\hat{\psi}_3[n]$ for the third quadrant, and $\hat{\psi}_4[n]$ for the fourth quadrant). Every time the sign of $x_I[n]$ or $x_Q[n]$ changes, which means that a quadrant change has occurred, the FSM updates the bias value $b[n]$ in one embodiment as shown in the following Equation XII:

$$b[n] = 2 \cdot \pm A + b[n-1] \quad \text{Equation XII}$$

In Equation XII, the sign of the amplitude (A) depends on the direction of rotation of the complex signal. In one embodiment, the FSM also selects the appropriate quadrant-dependent phase approximation, $\hat{\psi}[n] \in (\hat{\psi}_1[n], \hat{\psi}_2[n], \hat{\psi}_3[n], \hat{\psi}_4[n])$, depending on the entered state. The four quadrant-dependent phase approximations according to one embodiment are given in the following Equations XIII-XVI:

$$\hat{\psi}_1[n] = [x_Q[n] - x_I[n]] + b[n] \quad \text{Equation XIII}$$

$$\hat{\psi}_2[n] = [-x_Q[n] - x_I[n]] + b[n] \quad \text{Equation XIV}$$

$$\hat{\psi}_3[n] = [-x_Q[n] + x_I[n]] + b[n] \quad \text{Equation XV}$$

$$\hat{\psi}_4[n] = [x_Q[n] + x_I[n]] + b[n] \quad \text{Equation XVI}$$

Since at the $$\frac{\pi}{2}$$

borders, the value $\pm 2 \cdot A$ is equal to the value $\pm 2 \cdot x_I[n]$ or $\pm 2 \cdot x_Q[n]$, no additional calculations need to be done, and no additional hardware is necessary. According to Equation XI, the resulting phase approximation $\hat{\psi}_1[n]$ is linearly dependent on amplitude variations. Applied in adequate receiver architectures, where amplitude variations can be assumed to be quite small (e.g., limiter architectures), this linear dependence is typically acceptable, especially in comparison to other techniques that have a quadratic dependence on amplitude variations.

Figure 4:
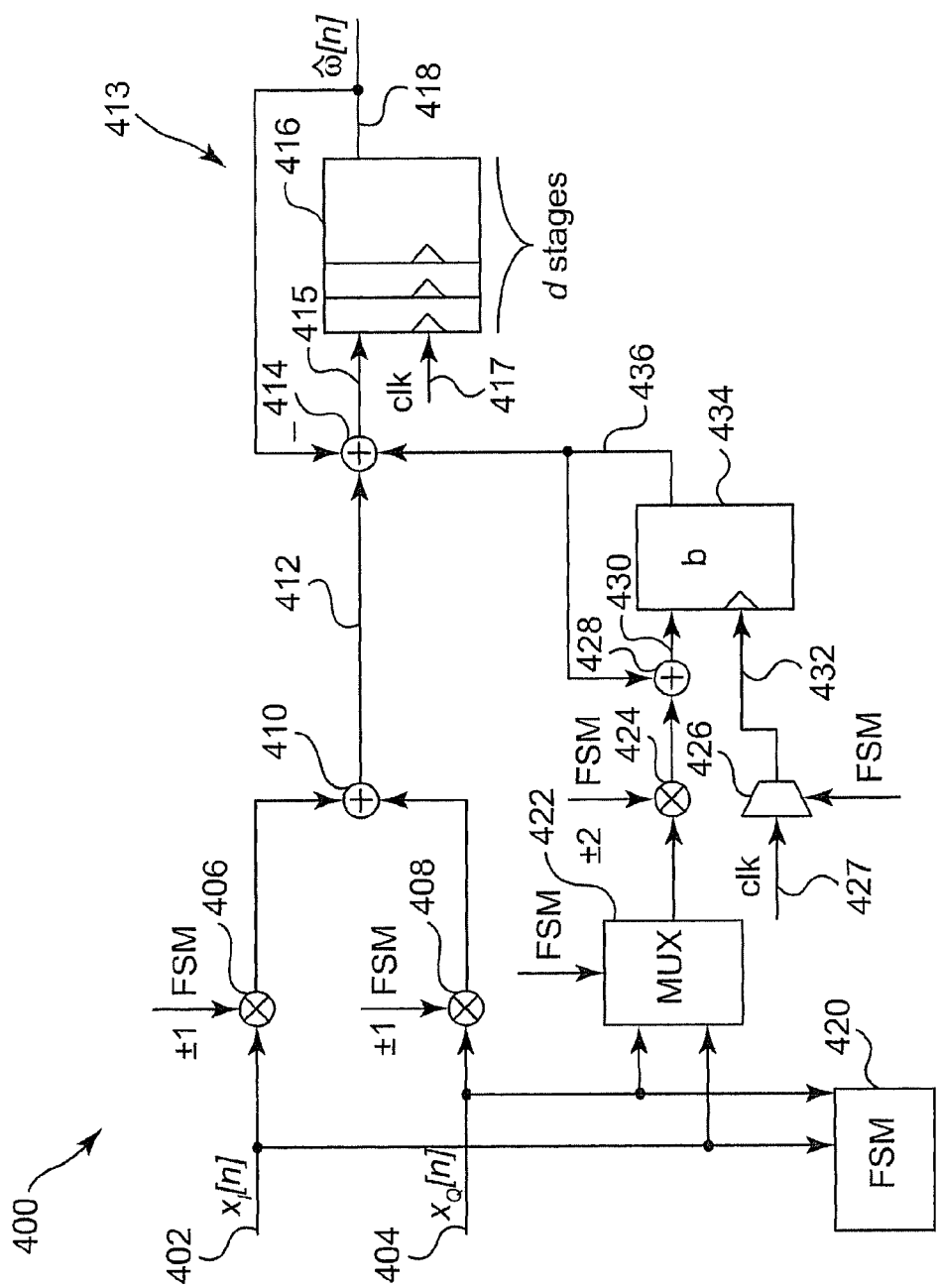
FIG. 4 is a diagram illustrating a circuit for generating a phase estimation and angular velocity estimation based on in-phase and quadrature phase signals according to one embodiment.

FIG. 4 is a diagram illustrating a circuit 400 for generating a phase estimation and angular velocity estimation based on in-phase and quadrature phase signals according to one embodiment. Circuit 400 includes multipliers 406 and 408, adders 410 and 414, comb filter 413 with delay stages 416, controller or finite state machine (FSM) 420, and a bias generating circuit including multiplexer (MUX) 422, multiplier 424, gated clock 426, adder 428, and register 434. Circuit 400 receives as an input a complex signal. The complex signal includes an in-phase component ($x_I[n]$) that is received on input 402, and a quadrature-phase component ($x_Q[n]$) that is received on input 404.

The in-phase component is provided to multiplier 406, and the quadrature-phase component is provided to multiplier 408. Multipliers 406 and 408 each receive a plus or minus one value from FSM 420. The connections between FSM 420 and other elements in circuit 400 are not shown to simplify the Figure. Multiplier 406 multiplies the received in-phase component by the plus or minus one value received from FSM 420, and outputs the result of the multiplication to adder 410. Multiplier 408 multiplies the received quadrature-phase component by the plus or minus one value received from FSM 420, and outputs the result of the multiplication to adder 410. Adder 410 adds the multiplication results received from multipliers 406 and 408, and outputs a value on line 412 that represents the sum of the multiplications.

The in-phase and quadrature-phase components received on inputs 402 and 404, respectively, are also provided to FSM 420 and multiplexer 422. Multiplexer 422 is controlled by FSM 420. Based on a control signal received from FSM 420, multiplexer 422 selectively outputs either the received in-phase component, or the received quadrature-phase component, to multiplier 424. Multiplier 424 also receives a plus or minus two value from FSM 420. Multiplier 424 multiplies the received in-phase component or quadrature-phase component by the plus or minus two value received from FSM 420, and outputs the result of the multiplication to adder 428. Adder 428 adds the multiplication result received from multiplier 424 and the value on the output line 436 of the register 434, and outputs a value on line 430 that represents the sum. The value output by adder 428 on line 430 to the input of register 434 represents a current bias value (b[n]). The value output by register 434 to adder 428 on line 436 represents the previous bias value (b[n−1]). Thus, the adder 428 adds the multiplication result received from multiplier 424 and the previous bias value (b[n−1]) received from register 434 to generate the new bias value (b[n]), which is provided to the input of the register 434 on line 430.

Gated clock 426 receives a clock signal on input 427, and receives an enable signal from FSM 420. When enabled by FSM 420, gated clock 426 outputs a clock signal to register 434 on line 432, thereby causing register 434 to output on line 436 the bias value received from adder 428. In one embodiment, FSM 420 outputs an enable signal to gated clock 426 each time that FSM 420 changes states (i.e., each time that the complex signal transitions to a different quadrant).

Adder 414 receives a sum from adder 410 and a bias value from register 434 and adds these two values, with the result representing a current phase estimation value ($\hat{\phi}[n]$). In one embodiment, adder 414 outputs the current phase estimation value from circuit 400. In another embodiment, a comb filter 413 is used to generate an angular velocity estimation from the phase estimation. Comb filter 413 includes delay stages 416 and a feedback path from output 418 to adder 414. Adder 414 subtracts a value (output by delay stages 416 on line 418) from the current phase value, and outputs the result to delay stages 416 on line 415. Delay stages 416 are clocked by clock signal 417, and include a plurality of stages for delaying the signal received from adder 414. Delay stages 416 output a current angular velocity estimation ($\hat{\omega}[n]$) on line 418. Since the angular velocity is proportional to frequency, the angular velocity estimation output by delay stages 416 is also representative of a current frequency estimation.

Figure 5:
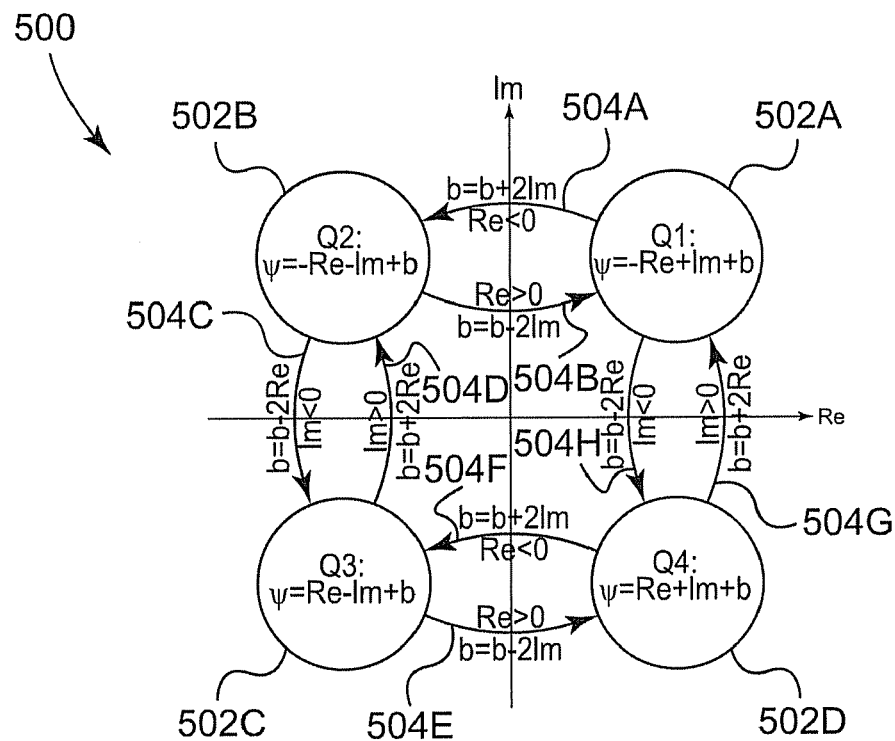
FIG. 5 is a state diagram illustrating the states of the finite state machine shown in FIG. 4 according to one embodiment.

FIG. 5 is a state diagram 500 illustrating the states of the finite state machine (FSM) 420 shown in FIG. 4 according to one embodiment. In the illustrated embodiment, FSM 420 is a 2-bit state machine that includes four states 502A-502D. State 502A corresponds to the first quadrant (i.e., 0 to $\pi/2$) of the unit circle for a complex signal, state 502B corresponds to the second quadrant (i.e., $\pi/2$ to $\pi$), state 502C corresponds to the third quadrant (i.e., $\pi$ to $3\pi/2$), and state 502D corresponds to the fourth quadrant (i.e., $3\pi/2$ to $2\pi$). The vertical axis in diagram 500 is the imaginary (Im) axis for the complex signal, and the horizontal axis is the real (Re) axis for the complex signal. The transitions between states 502A-502D are represented by arrows 504A-504H. FSM 420 changes between the four states 502A-502D based upon the quadrant currently occupied by the complex signal received by circuit 400.

When FSM 420 is in the first state 502A, the phase is estimated as shown in the following Equation XVII:

$$\hat{\psi}_1[n]=[x_Q[n]-x_I[n]]+b[n] \quad \text{Equation XVII}$$

Thus, for the first quadrant, the phase calculation uses the positive value of the imaginary or quadrature-phase component ($x_Q[n]$) and the negative value of the real or in-phase component ($x_I[n]$). Accordingly, while in the first state 502A, FSM 420 will output a negative one to multiplier 406 and a positive one to multiplier 408.

The bias value (b[n]) for the first state 502A depends upon whether state 502A was entered from the second state 502B or from the fourth state 502D. If the first state 502A is entered from the second state 502B, as indicated by arrow 504B, the bias value is calculated as shown in the following Equation XVIII:

$$b[n]=b[n-1]-2 \cdot x_Q[n] \quad \text{Equation XVIII}$$

As indicated by Equation XVIII, the bias value is calculated by subtracting two times the imaginary component of the complex signal from the previous bias value. Accordingly, for this bias calculation, FSM 420 causes multiplexer 422 to output the quadrature-phase component on input 404 to the multiplier 424, and outputs a negative two value to the multiplier 424.

If the first state 502A is entered from the fourth state 502D, as indicated by arrow 504G, the bias value is calculated as shown in the following Equation XIX:

$$b[n]=b[n-1]+2 \cdot x_I[n] \quad \text{Equation XIX}$$

As indicated by Equation XIX, the bias value is calculated by adding two times the real component of the complex signal to the previous bias value. Accordingly, for this bias calculation, FSM 420 causes multiplexer 422 to output the in-phase component on input 402 to the multiplier 424, and outputs a positive two value to the multiplier 424.

When FSM 420 is in the second state 502B, the phase is estimated as shown in the following Equation XX:

$$\hat{\psi}_2[n]=[-x_Q[n]-x_I[n]]+b[n] \quad \text{Equation XX}$$

Thus, for the second quadrant, the phase calculation uses the negative value of the imaginary or quadrature-phase component ($x_Q[n]$) and the negative value of the real or in-phase component ($x_I[n]$). Accordingly, while in the second state 502B, FSM 420 will output a negative one to multiplier 406 and a negative one to multiplier 408.

The bias value (b[n]) for the second state 502B depends upon whether state 502B was entered from the first state 502A or from the third state 502C. If the second state 502B is entered from the first state 502A, as indicated by arrow 504A, the bias value is calculated as shown in the following Equation XXI:

$$b[n]=b[n-1]+2 \cdot x_Q[n] \quad \text{Equation XXI}$$

As indicated by Equation XXI, the bias value is calculated by adding two times the imaginary component of the complex signal to the previous bias value. Accordingly, for this bias calculation, FSM 420 causes multiplexer 422 to output the quadrature-phase component on input 404 to the multiplier 424, and outputs a positive two value to the multiplier 424.

If the second state 502B is entered from the third state 502C, as indicated by arrow 504D, the bias value is calculated as shown in the following Equation XXII:

$$b[n]=b[n-1]+2\cdot x_I[n] \qquad \text{Equation XXII}$$

As indicated by Equation XXII, the bias value is calculated by adding two times the real component of the complex signal to the previous bias value. Accordingly, for this bias calculation, FSM 420 causes multiplexer 422 to output the in-phase component on input 402 to the multiplier 424, and outputs a positive two value to the multiplier 424.

When FSM 420 is in the third state 502C, the phase is estimated as shown in the following Equation XXIII:

$$\hat{\psi}_3[n]=[-x_Q[n]+x_I[n]]+b[n] \qquad \text{Equation XXIII}$$

Thus, for the third quadrant, the phase calculation uses the negative value of the imaginary or quadrature-phase component ($x_Q[n]$) and the positive value of the real or in-phase component ($x_I[n]$). Accordingly, while in the third state 502C, FSM 420 will output a positive one to multiplier 406 and a negative one to multiplier 408.

The bias value ($b[n]$) for the third state 502C depends upon whether state 502C was entered from the second state 502B or from the fourth state 502D. If the third state 502C is entered from the second state 502B, as indicated by arrow 504C, the bias value is calculated as shown in the following Equation XXIV:

$$b[n]=b[n-1]-2\cdot x_I[n] \qquad \text{Equation XXIV}$$

As indicated by Equation XXIV, the bias value is calculated by subtracting two times the real component of the complex signal from the previous bias value. Accordingly, for this bias calculation, FSM 420 causes multiplexer 422 to output the in-phase component on input 402 to the multiplier 424, and outputs a negative two value to the multiplier 424.

If the third state 502C is entered from the fourth state 502D, as indicated by arrow 504F, the bias value is calculated as shown in the following Equation XXV:

$$b[n]=b[n-1]+2\cdot x_Q[n] \qquad \text{Equation XXV}$$

As indicated by Equation XXV, the bias value is calculated by adding two times the imaginary component of the complex signal to the previous bias value. Accordingly, for this bias calculation, FSM 420 causes multiplexer 422 to output the quadrature-phase component on input 404 to the multiplier 424, and outputs a positive two value to the multiplier 424.

When FSM 420 is in the fourth state 502D, the phase is estimated as shown in the following Equation XXVI:

$$\hat{\psi}_4[n]=[x_Q[n]+x_I[n]]+b[n] \qquad \text{Equation XXVI}$$

Thus, for the fourth quadrant, the phase calculation uses the positive value of the imaginary or quadrature-phase component ($x_Q[n]$) and the positive value of the real or in-phase component ($x_I[n]$). Accordingly, while in the fourth state 502D, FSM 420 will output a positive one to multiplier 406 and a positive one to multiplier 408.

The bias value ($b[n]$) for the fourth state 502D depends upon whether state 502D was entered from the third state 502C or from the first state 502A. If the fourth state 502D is entered from the third state 502C, as indicated by arrow 504E, the bias value is calculated as shown in the following Equation XXVII:

$$b[n]=b[n-1]-2\cdot x_Q[n] \qquad \text{Equation XXVII}$$

As indicated by Equation XXVII, the bias value is calculated by subtracting two times the imaginary component of the complex signal from the previous bias value. Accordingly, for this bias calculation, FSM 420 causes multiplexer 422 to output the quadrature-phase component on input 404 to the multiplier 424, and outputs a negative two value to the multiplier 424.

If the fourth state 502D is entered from the first state 502A, as indicated by arrow 504H, the bias value is calculated as shown in the following Equation XXVIII:

$$b[n]=b[n-1]-2\cdot x_I[n] \qquad \text{Equation XXVIII}$$

As indicated by Equation XXVIII, the bias value is calculated by subtracting two times the real component of the complex signal from the previous bias value. Accordingly, for this bias calculation, FSM 420 causes multiplexer 422 to output the in-phase component on input 402 to the multiplier 424, and outputs a negative two value to the multiplier 424.

As mentioned above with respect to FIG. 4, an angular velocity estimation can be made from the phase estimation generated by circuit 400 using a comb filter (e.g., comb filter 413). A comb filter adds a delayed version of a signal to itself. A feed-forward comb filter, $H_{comb}$, with a delay, d, can be represented as shown in the following Equation XXIX:

$$H_{comb}=(z^d+\alpha)/z^d \qquad \text{Equation XXIX}$$

In Equation XXIX, $z=e^{-j\omega}$, and $\alpha$ is a scaling factor applied to the delayed signal. With a scaling factor of $\alpha=-1$, the angular velocity can be approximated as shown in the following Equation XXX:

$$\hat{\omega}[n] = h_{comb}[n] * \hat{\psi}[n] \qquad \text{Equation XXX}$$
$$= \hat{\psi}[n] - \hat{\psi}[n-d]$$
$$= \left(\hat{\phi}[n] - \frac{\pi}{4}\right)\cdot A[n]\cdot\frac{4}{\pi} - \left(\hat{\phi}[n-d] - \frac{\pi}{4}\right)\cdot A[n-d]\cdot\frac{4}{\pi}$$

If the amplitude is assumed to be constant ($A[n]=A[n-d]$), the angular velocity may be written as shown in the following Equation XXXI:

$$\hat{\omega}[n] = \left(\hat{\phi}[n] - \hat{\phi}[n-d]\right)\cdot A\cdot\frac{4}{\pi} = \Delta\hat{\phi}\cdot A\cdot\frac{4}{\pi} \qquad \text{Equation XXXI}$$

When implemented in hardware, $\hat{\psi}_1[n]$ could suffer an overflow after some arbitrarily short time, since in practical implementations, positive and negative frequencies may not be balanced perfectly. A mismatch between the positive and negative frequency deviation at the intermediate frequency (e.g., caused by a frequency shift between the transmitter's and the receiver's local oscillator) will speed up this behavior significantly. However, if the phase estimate, $\hat{\psi}_1[n]$, is used in frequency shift key (FSK) demodulation systems, an overflow for $\hat{\psi}_1[n]$ has no impact as long as only one overflow is caused within d time steps. Moreover, the bit width of $\hat{\psi}_1[n]$ can be minimized by designing the bit width exactly for one overflow per d time steps. Since $\hat{\psi}_1[n]$ is delayed d times (see Equation XXX), the hardware effort for the delay stages can be significantly reduced.

In addition, the circuit 400 according to one embodiment is not vulnerable to frequency offsets due to the frequency drift between the transmitter's and the receiver's local oscillator, whereas some phase determination techniques suffer severely under this behavior, and have a higher hardware complexity. When applied to an FSK demodulation system, the circuit 400 according to one embodiment has a smaller bit-width and outperforms other approaches with respect to power consumption and area requirements while having a similar performance and timing behavior.

The angular velocity $\omega_{R2}$ of the remainder (e.g., $R_2$ in Equation IX) is twice the angular velocity $\omega$ of x[n] (e.g., the frequency deviation is $2\cdot\pi\cdot\Delta f$). This property is exploited in one embodiment by placing a zero at $\omega_{R2}$ in $H_{comb}$, and therefore the impact of the rejection of the remainder is canceled. Thus, the delay parameter, d, is chosen in one embodiment such that the resulting change in phase between the signal and its feedback path is $$\Delta\phi = \frac{\pi}{2}.$$

This might not be reached perfectly in some implementations, but the impact of the rejection of the remainder has minima at multiples of $$\Delta\phi = \frac{\pi}{2}.$$

Choosing $\Delta\phi=\pi$ and $\omega=2\cdot\pi\cdot\Delta f$, and assuming a sampling frequency, $f_s$, the appropriate delay, d, can be calculated as shown in the following Equation XXXII:

$$d = \frac{\Delta\phi}{2\cdot\pi\cdot\frac{\Delta f}{f_s}} = \frac{f_s}{4\cdot\Delta f} \qquad \text{Equation XXXII}$$

The quality of the approximation can be assessed using the quality value, Q, as defined in the following Equation XXXIII:

$$Q = 10\cdot\log_{10}\frac{\sum_n |y[n] - \hat{y}[n]|^2}{\sum_n |y[n]|^2} \qquad \text{Equation XXXIII}$$

Figure 6:
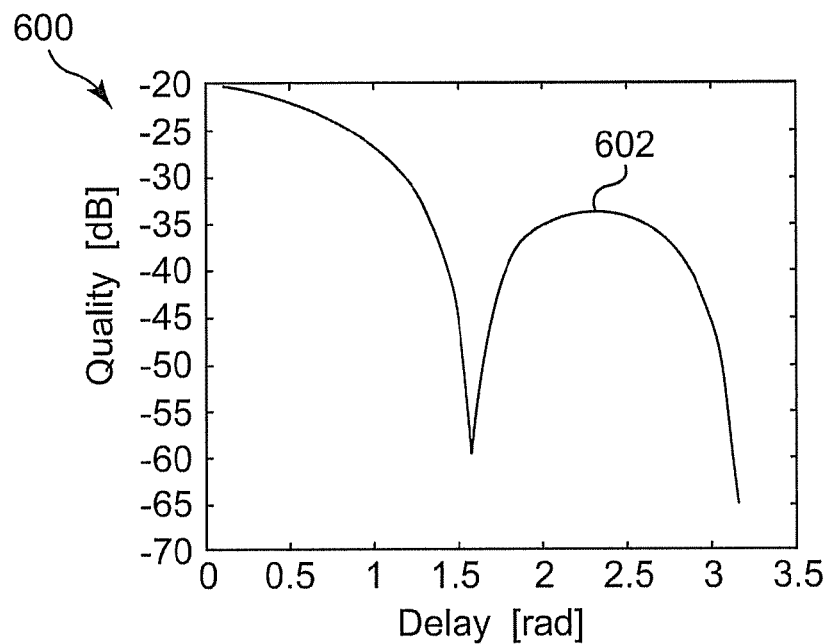
FIG. 6 is a diagram illustrating a graph of angular velocity estimation quality versus delay according to one embodiment.

FIG. 6 is a diagram illustrating a graph 600 of angular velocity estimation quality versus delay according to one embodiment. The vertical axis in graph 600 represents quality (Q) in dB, and the horizontal axis represents delay ($\Delta\phi$). Curve 602 represents the relation between the quality of approximation of the angular velocity and the chosen $\Delta\phi\in[0, \pi]$, as calculated using Equation XXXIII.

As mentioned above, the local minima for the rejection of the remainder can be found at multiples of $$\Delta\phi = \frac{\pi}{2}.$$

Figure 7:
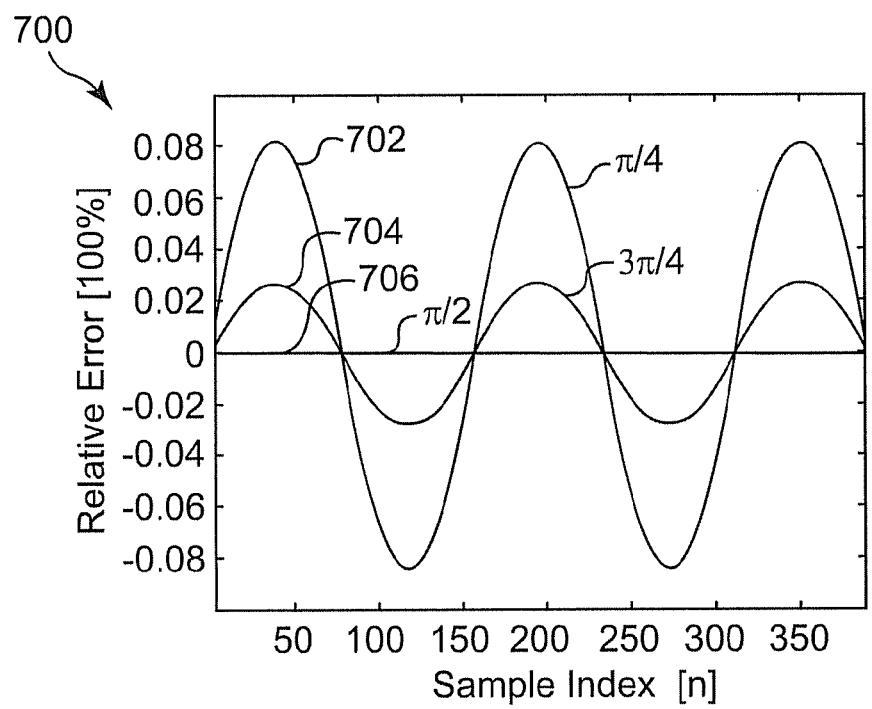
FIG. 7 is a diagram illustrating a graph of the relative error of the angular velocity estimation versus sample index according to one embodiment.

FIG. 7 is a diagram illustrating a graph 700 of the relative error of the angular velocity estimation versus sample index (n) according to one embodiment. The vertical axis in graph 700 represents relative error in percentages, and the horizontal axis represents the sample index (n). The relative error of approximation is shown for different choices of $\Delta\phi$, which are represented by curves 702, 704, and 706. Curve 702 corresponds to $$\Delta\phi = \frac{\pi}{4}.$$

Curve 704 corresponds to $$\Delta\phi = \frac{3\pi}{4}.$$

Curve 706 corresponds to $$\Delta\phi = \frac{\pi}{2}.$$

The largest relative error is made for $$\Delta\phi = \frac{\pi}{4}$$

(curve 702). The same absolute error but a smaller relative error is made for $$\Delta\phi = \frac{3\pi}{4}$$

(curve 704). Almost no error is made for $$\Delta\phi = \frac{\pi}{2}$$

(curve 706).

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of generating a phase value representative of a phase of a complex signal that includes an in-phase component and a quadrature-phase component, the method comprising:
    determining a first sign for a first value and a second sign for a second value based on a quadrant occupied by the complex signal;
    multiplying the in-phase component by the first value with the first sign, thereby generating a first multiplication result;
    multiplying the quadrature-phase component by the second value with the second sign, thereby generating a second multiplication result;
    generating a bias value based on an amplitude value; and adding the first multiplication result, the second multiplication result, and the bias value,
thereby generating the phase value for the complex signal.

2. The method of claim 1, wherein the first value and the second value are each one.

3. The method of claim 1, and further comprising:
causing the first value to have a negative sign when the complex signal is in a first or second quadrant, and a positive sign when the complex signal is in a third or fourth quadrant.

4. The method of claim 3, and further comprising:
causing the second value to have a negative sign when the complex signal is in the second or third quadrant, and a positive sign when the complex signal is in the first or fourth quadrant.

5. The method of claim 1, and further comprising:
generating the bias value based on a previously calculated bias value and the amplitude value.

6. The method of claim 5, and further comprising:
selecting one of the in-phase component and the quadrature-phase component based on a transition between quadrants by the complex signal; and
multiplying the selected component by two, thereby generating the amplitude value.

7. The method of claim 6, and further comprising:
determining a sign for the amplitude value based on the transition between quadrants; and
adding the previously calculated bias value and the amplitude value with the determined sign, thereby generating the bias value.

8. The method of claim 1, and further comprising:
filtering the generated phase value and subsequently generated phase values, thereby generating angular velocity values.

9. The method of claim 8, wherein the filtering is performed by a comb filter.

10. The method of claim 9, wherein the comb filter produces a delay that causes a change in phase of $\pi/2$ radians.

11. A circuit for generating a phase value representative of a phase of a complex signal that includes an in-phase component and a quadrature-phase component, the circuit comprising:
a finite state machine having a plurality of states, each state corresponding to a quadrant of a unit circle for the complex signal, the finite state machine configured to determine a first sign for a first value and a second sign for a second value based on a quadrant occupied by the complex signal;
a first multiplier configured to multiply the in-phase component by the first value with the first sign, thereby generating a first multiplication result;
a second multiplier configured to multiply the quadrature-phase component by the second value with the second sign, thereby generating a second multiplication result;
a bias generating circuit for generating a bias value based on an amplitude value; and
at least one adder configured to add the first multiplication result, the second multiplication result, and the bias value, thereby generating the phase value for the complex signal.

12. The circuit of claim 11, wherein the first value and the second value are each one.

13. The circuit of claim 11, wherein the finite state machine is configured to cause the first value to have a negative sign when the complex signal is in a first or second quadrant, and a positive sign when the complex signal is in a third or fourth quadrant.

14. The circuit of claim 13, wherein the finite state machine is configured to cause the second value to have a negative sign when the complex signal is in the second or third quadrant, and a positive sign when the complex signal is in the first or fourth quadrant.

15. The circuit of claim 11, and further comprising:
a bias generating circuit for generating the bias value based on a previously calculated bias value and the amplitude value.

16. The circuit of claim 15, wherein the bias generating circuit comprises:
a multiplexer configured to selectively output one of the in-phase component or the quadrature-phase component based on a quadrant transition of the complex signal identified by the finite state machine; and
a third multiplier configured to receive the component output by the multiplexer, and multiply the received component by a scaling factor, thereby generating the amplitude value.

17. The circuit of claim 16, wherein the finite state machine is configured to determine a sign for the scaling factor based on the quadrant transition, and wherein the bias generating circuit further comprises:
an adder configured to add the previously calculated bias value and the amplitude value, thereby generating the bias value.

18. The circuit of claim 17, and further comprising:
a register configured to receive the generated bias value.

19. The circuit of claim 11, and further comprising:
a comb filter configured to filter the generated phase value and subsequently generated phase values, thereby generating angular velocity values.

20. A circuit for generating a phase value representative of a phase of a complex signal that includes an in-phase component and a quadrature-phase component, the circuit comprising:
a first multiplier configured to multiply the in-phase component by a first value, thereby generating a first multiplication result;
a second multiplier configured to multiply the quadrature-phase component by a second value, thereby generating a second multiplication result;
a bias generating circuit for generating a bias value based on an amplitude value;
at least one adder configured to add the first multiplication result, the second multiplication result, and the bias value, thereby generating the phase value for the complex signal; and
a finite state machine having a plurality of states, each state corresponding to a quadrant of a unit circle for the complex signal, the finite state machine configured to modify the first value, the second value, and the bias value based on a current quadrant occupied by the complex signal and transitions between quadrants.

21. A method of generating a phase value representative of a phase of a complex signal that includes an in-phase component and a quadrature-phase component, the method comprising:
determining a first sign for a first value and a second sign for a second value based on a quadrant occupied by the complex signal;
multiplying the in-phase component by the first value with the first sign, thereby generating a first multiplication result;

multiplying the quadrature-phase component by the second value with the second sign, thereby generating a second multiplication result;

adding the first multiplication result, the second multiplication result, and a bias value, thereby generating the phase value for the complex signal; and filtering the generated phase value and subsequently generated phase values, thereby generating angular velocity values.

* * * * *